US009253160B2

(12) United States Patent
Lawson

(10) Patent No.: US 9,253,160 B2
(45) Date of Patent: Feb. 2, 2016

(54) METHODS, SYSTEMS, AND MEDIA FOR SECURE CONNECTION MANAGEMENT AND AUTOMATIC COMPRESSION OVER METERED DATA CONNECTIONS

(71) Applicant: Kent Lawson, Sherman, CT (US)

(72) Inventor: Kent Lawson, Sherman, CT (US)

( * ) Notice: Subject to any disclaimer, the term of this patent is extended or adjusted under 35 U.S.C. 154(b) by 0 days.

(21) Appl. No.: 14/657,047

(22) Filed: Mar. 13, 2015

(65) Prior Publication Data
US 2015/0188889 A1 Jul. 2, 2015

Related U.S. Application Data

(63) Continuation-in-part of application No. 14/144,750, filed on Dec. 31, 2013.

(60) Provisional application No. 61/747,912, filed on Dec. 31, 2012.

(51) Int. Cl.
H04L 29/06 (2006.01)
H04L 29/08 (2006.01)

(52) U.S. Cl.
CPC ........ *H04L 63/0272* (2013.01); *H04L 63/0281* (2013.01); *H04L 67/141* (2013.01)

(58) Field of Classification Search
CPC ...... H04L 63/0272; H04L 63/10; G06F 21/62
See application file for complete search history.

(56) References Cited

U.S. PATENT DOCUMENTS

| 6,606,664 | B2 * | 8/2003 | Darago et al. ............... 709/229 |
| 7,042,988 | B2 * | 5/2006 | Juitt ........................ H04L 1/22 370/329 |
| 7,386,885 | B1 | 6/2008 | Kaspersky et al. |
| 7,730,535 | B1 | 6/2010 | Kaspersky et al. |
| 8,381,282 | B1 * | 2/2013 | Doukhvalov et al. ........... 726/12 |
| 8,396,966 | B2 | 3/2013 | Graves et al. |
| 2004/0039827 | A1 | 2/2004 | Thomas et al. |
| 2005/0180319 | A1 | 8/2005 | Hutnik et al. |
| 2009/0003368 | A1 * | 1/2009 | Brown ........................ 370/410 |
| 2011/0280244 | A1 | 11/2011 | Gopinath et al. |
| 2012/0198519 | A1 | 8/2012 | Parla et al. |
| 2012/0323703 | A1 | 12/2012 | Hillier |

(Continued)

OTHER PUBLICATIONS

Cleveland, Frances M. "Cyber security issues for advanced metering infrasttructure (ami)." Power and Energy Society General Meeting-Conversion and Delivery of Electrical Energy in the 21st Century, 2008 IEEE. IEEE, 2008.*

(Continued)

*Primary Examiner* — Mohammad L Rahman
(74) *Attorney, Agent, or Firm* — Byrne Poh LLP

(57) ABSTRACT

Methods, systems and media for facilitating compression over a metered data connection are provided. In some embodiments, the methods comprise: detecting a new wireless network connection; determining that the new connection is metered; sending, via a proxy server, requests for content to a content server using the metered data connection; receiving, via the proxy server, content from the content server compressed by the proxy server using the metered data connection; detecting a second new wireless network connection; determining that the second new wireless network connection is not a metered data connection; causing the proxy server to inhibit compression of content sent to the user device in response to determining that the second new wireless network connection is not a metered data connection.

18 Claims, 7 Drawing Sheets

(56) References Cited

U.S. PATENT DOCUMENTS

| | | |
|---|---|---|
| 2013/0332724 A1 | 12/2013 | Walters |
| 2013/0333018 A1 | 12/2013 | Doukhvalov et al. |
| 2013/0346559 A1 | 12/2013 | Van Erven et al. |
| 2014/0024339 A1* | 1/2014 | Dabbiere et al. ............. 455/406 |
| 2014/0108018 A1* | 4/2014 | Phillips et al. ................ 704/275 |
| 2014/0173111 A1* | 6/2014 | Varner ......................... 709/225 |

OTHER PUBLICATIONS

Li, Xu, et al. "Securing smart grid: cyber attacks, countermeasures, and challenges." Communications Magazine, IEEE 50.8 (2012).*
Office Action dated Mar. 3, 2014 in U.S. Appl. No. 14/144,750.
Office Action dated Jun. 16, 2015 in U.S. Appl. No. 14/144,750.
Office Action dated Aug. 27, 2014 in U.S. Appl. No. 14/144,750.
U.S. Appl. No. 61/747,912, filed Dec. 31, 2012.

* cited by examiner

METHODS, SYSTEMS, AND MEDIA FOR SECURE CONNECTION MANAGEMENT AND AUTOMATIC COMPRESSION OVER METERED DATA CONNECTIONS

CROSS-REFERENCE TO RELATED APPLICATIONS

This application is a continuation-in-part under 35 U.S.C. §120 of U.S. patent application Ser. No. 14/144,750, filed Dec. 31, 2013, which claims the benefit of U.S. Provisional Patent Application No. 61/747,912, filed Dec. 31, 2012, each of which is hereby incorporated by reference herein in its entirety.

TECHNICAL FIELD

The disclosed subject matter relates to methods, systems, and media for secure connection management and automatic compression over metered data connections.

BACKGROUND

Wireless network connections (e.g., Wi-Fi, cellular data connections, connections to wireless hotspots that use cellular data connections, etc.) are increasingly being used to connect devices (e.g., laptop computers, tablet computers, smartphones, etc.) to networks, such as, the Internet. Unsecured wireless networks (e.g., a network that is not password protected and encrypted using, for example, wireless protected access) present security and privacy risks to users of devices connected to such networks. Connecting to an unsecured network, such as a public Wi-Fi hotspot, can allow malicious users to gain access to unencrypted communications through sniffers, sidejacking, honeypot attacks, Address Resolution Protocol (ARP) spoofing, etc. Technologies exist for securing communications over an unsecured network, but the technologies rely on the user to determine the security of a network and connect to a service, such as a VPN, manually each time they connect through an unsecured network. Many users do not expend the effort to do this, or lack the technical know-how to secure their communications.

Additionally, many providers of wireless network connections, such as cellular data providers, charge based on the amount of data sent over the wireless network connection, provide an allotted amount of data that can be sent over the wireless network connection for a period of time, limit bandwidth when an amount of data sent over the wireless network connection exceeds a threshold amount of data (e.g., a data cap), and/or otherwise seek to limit the usage of the wireless network connection.

Therefore there is a need for approaches for automatically detecting the security of a network that a device is connected to and controlling that device's connection to the network based on the detected security, as well as automatically compressing data sent over a metered data connection. Accordingly, it is desirable to provide methods, systems, and media for secure connection management.

SUMMARY

In accordance with various embodiments of the disclosed subject matter, methods, systems, and media for automatic compression over metered data connections are provided.

In accordance with some embodiments of the disclosed subject matter, a method for facilitating compression over a metered data connection is provided, the method comprising: detecting, using a hardware processor of a user device, a first new wireless network connection; determining, using the hardware processor of the user device, that the first new wireless network connection is a metered data connection; sending, via a proxy server, one or more requests for content to at least one remote content server using the metered data connection in response to determining that the new wireless connection is a metered data connection; receiving, via the proxy server, content from the content server using the metered data connection, wherein the content is compressed by the proxy server; determining, using the hardware processor of the user device, that the first new wireless network connection is a secure connection; upon determining that the first new wireless network connection is a secure connection, indicating to a user that the first new wireless network connection is secure; detecting, using the hardware processor of a user device, a second new wireless network connection; determining, using the hardware processor of the user device, that the second new wireless network connection is a non-secure wireless connection; determining, using the hardware processor of the user device, that the second new wireless network connection is not a metered data connection; causing the proxy server to inhibit compression of content sent to the user device in response to determining that the second new wireless network connection is not a metered data connection; causing, using the hardware processor of the user device, information sent by the user device over the second new wireless network connection to be encrypted in response to determining that the second new wireless network connection is not secure; establishing a virtual private network connection between the user device and a virtual private network server using encrypted information sent over the second new wireless network connection in response to determining that the second new wireless network connection is not secure; upon establishing the virtual private network connection, indicating to a user that the second new wireless network connection is secure based on the virtual private network connection being established; and receiving, using the hardware processor of the user device, content from the at least one remote content server over the second new wireless network connection as encrypted information from the virtual private network server.

In some embodiments of the disclosed subject matter, a system for facilitating compression over a metered data connection is provided, the system comprising: a hardware processor of a user device programmed to: detecting, using a hardware processor of a user device, a first new wireless network connection; determine that the first new wireless network connection is a metered data connection; send, via a proxy server, one or more requests for content to at least one remote content server using the metered data connection in response to determining that the new wireless connection is a metered data connection; receive, via the proxy server, content from the content server using the metered data connection, wherein the content is compressed by the proxy server; determine, using the hardware processor of the user device, that the first new wireless network connection is a secure connection; upon determining that the first new wireless network connection is a secure connection, indicate to a user that the first new wireless network connection is secure; detect a second new wireless network connection; determine that the second new wireless network connection is a non-secure wireless connection; determine that the second new wireless network connection is not a metered data connection; cause the proxy server to inhibit compression of content sent to the user device in response to determining that the second new wireless network connection is not a metered data connection; cause information sent by the user device over the second new wireless network connection to be encrypted in response to determining that the second new wireless network connection is not secure; establish a virtual private network connection between the user device and a virtual private network server using encrypted information sent over the second new wireless network connection in response to determining that the second new wireless network connection is not secure; upon establishing the virtual private network connection, indicate to a user that the second new wireless network connection is secure based on the virtual private network connection being established; and receive content from the at least one remote content server over the second new wireless network connection as encrypted information from the virtual private network server.

In some embodiments of the disclosed subject matter, a non-transitory computer-readable medium containing computer executable instructions that, when executed by a processor, cause the processor to perform a method for facilitating compression over a metered data connection is provided, the method comprising: detecting a first new wireless network connection; determining that the first new wireless network connection is a metered data connection; sending, via a proxy server, one or more requests for content to at least one remote content server using the metered data connection in response to determining that the new wireless connection is a metered data connection; receiving, via the proxy server, content from the content server using the metered data connection, wherein the content is compressed by the proxy server; determining that the first new wireless network connection is a secure connection; upon determining that the first new wireless network connection is a secure connection, indicating to a user that the first new wireless network connection is secure; detecting a second new wireless network connection; determining that the second new wireless network connection is a non-secure wireless connection; determining that the second new wireless network connection is not a metered data connection; causing the proxy server to inhibit compression of content sent to the user device in response to determining that the second new wireless network connection is not a metered data connection; causing information sent by the user device over the second new wireless network connection to be encrypted in response to determining that the second new wireless network connection is not secure; establishing a virtual private network connection between the user device and a virtual private network server using encrypted information sent over the second new wireless network connection in response to determining that the second new wireless network connection is not secure; upon establishing the virtual private network connection, indicating to a user that the second new wireless network connection is secure based on the virtual private network connection being established; and receiving content from the at least one remote content server over the second new wireless network connection as encrypted information from the virtual private network server.

In some embodiments, the metered data connection is a cellular data connection.

In some embodiments, the proxy server and the virtual private network server are the same computing device.

In some embodiments, the method further comprises receiving at the user device, via the proxy server, pushed content from a server, wherein the pushed content was sent by the server without a request for the content from the user device and wherein the pushed content is compressed in the one or more compression formats associated with the proxy server.

In some embodiments, determining that the first new wireless network connection is a metered data connection comprises receiving user input related to the first new wireless connection, and the method further comprises determining based on the user input that the first new wireless connection is a metered connection.

In some embodiments, the method further comprises: detecting a third new wireless network connection; determining that the third new wireless network connection is the metered data connection; determining that the third new wireless network connection is a secure connection; determining that the virtual private network connection is established with the virtual private network server; and upon determining that the first new wireless network connection is a secure connection and that the virtual private network connection is established with the virtual private network server, discontinuing the virtual private network connection.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms for secure connection management are provided. These mechanisms can include automatically determining whether a device's connection to a network is secure and connecting the device to the network through a virtual private network when the connection is determined to not be a secure connection. Using these mechanisms for automatically connecting to the network securely, a user's privacy and device security can be protected.

These mechanisms can be used in a variety of applications. For example, these mechanisms can be used to ensure that a device is automatically connected to a network securely, without requiring a user of the device to be aware of the security of various network connections. In a more particular example, a device, such as a laptop computer, can be connected to the Internet securely on an unprotected public Wi-Fi hotspot by the mechanisms described herein automatically connecting the device to a virtual private network when it is determined that the public Wi-Fi connection is not secure.

In some embodiments, a VPN server that a device is connected to can act as a proxy server, where all traffic to and from the device can be encrypted and routed through the VPN server. Additionally or alternatively, the device can appear to be assigned a new Internet Protocol address (IP address) when the device makes a VPN connection. This can allow for a device user's privacy to be further protected by changing the IP address of the device.

Figure 1:
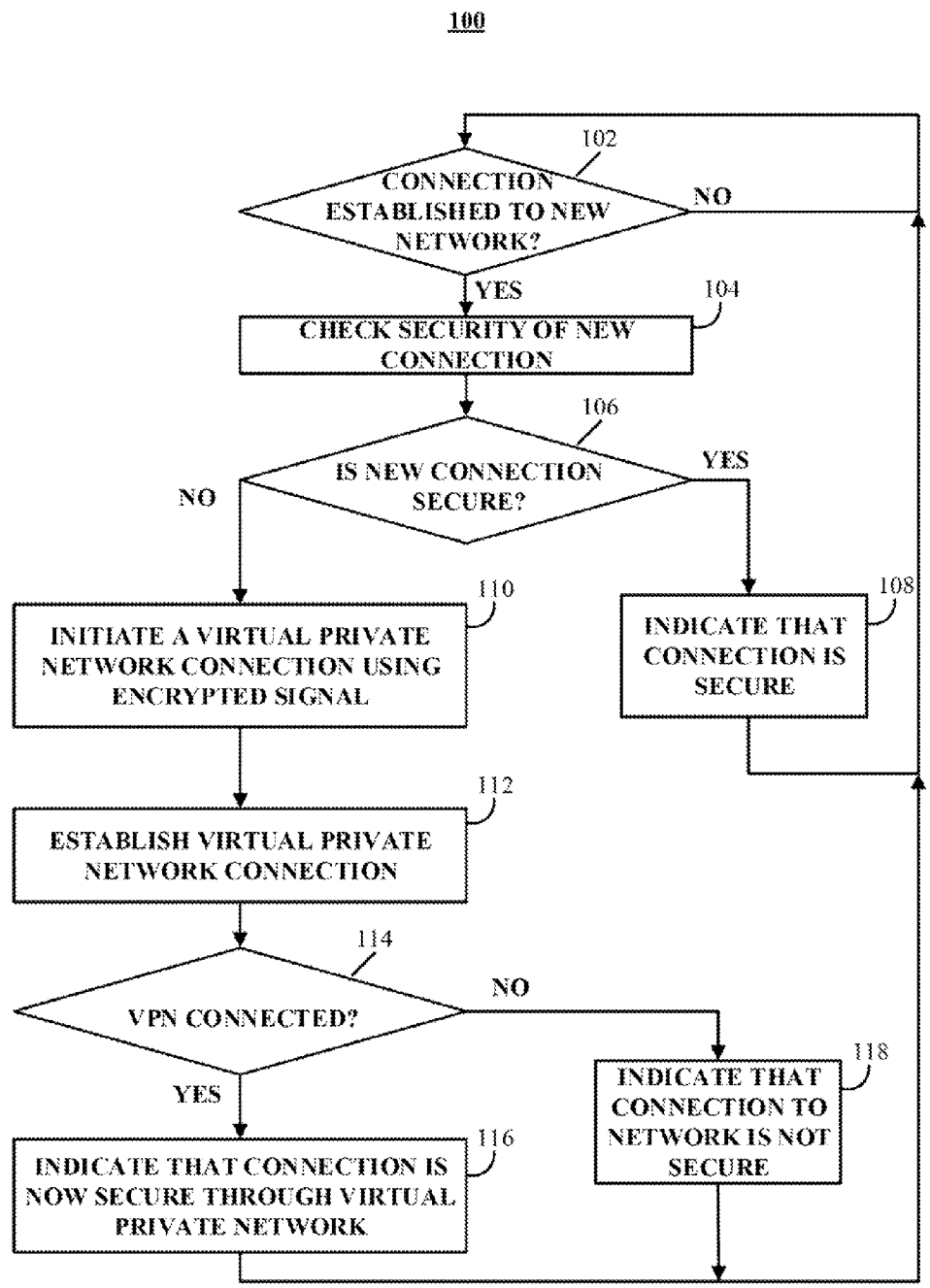
FIG. 1 shows an example of a process for secure connection management in accordance with some embodiments of the disclosed subject matter.

Turning to FIG. 1, an example 100 of a process for secure connection management is shown in accordance with some embodiments of the disclosed subject matter. In some embodiments, process 100 can be initiated in response to a user device being powered on and can run on the user device to determine if a new network connection has been established and whether that new network connection is a secure connection. For example, a laptop computer can initiate process 100 when the computer is powered on and can run process 100 in the background. As another example, process 100 can be initiated in response to a user selecting to initiate process 100. In a more particular example, process 100 can be included as part of an application installed on the user device, and the user can start the application to initiate process 100. As another example, process 100 can be initiated based on settings of a user device that executes process 100. In a more particular example, process 100 can be initiated when a network connection is enabled on the user device that executes process 100 (e.g., when a Wi-Fi connection is enabled). In another more particular example, process 100 can be initiated when the user device enters and/or exits a particular location (e.g., when the user device exits an area designated as a user's home, work, etc.). In some embodiments, process 100 can determine whether a user has entered and/or exited a particular location using any suitable technique or combination of techniques, such as using location data, signal strength from a Wi-Fi network (e.g., a home Wi-Fi network, a work Wi-Fi network, etc.).

At 102, process 100 can determine if a new network connection has been made by the device executing process 100. In some embodiments, process 100 can intercept an instruction to establish a new network connection. For example, if a laptop computer is powered on and attempts to make a connection to a wireless network (e.g., a network complying with any of the IEEE 802.11 standards for wireless networking, commonly referred to as Wi-Fi), process 100 can determine that a new network connection is being established. In such an example, if the user then connects to the same network by Ethernet cable, process 100 can determine that this is also a new connection. As another example, if a smartphone enters a range of a public Wi-Fi hotspot and the smartphone attempts to automatically connect to the Wi-Fi hotspot, process 100 can determine that this is a new network connection. As still another example, process 100 can check a status of a network connection (e.g., by determining whether an IP address of a network connection has been configured or changed) to determine if the a network connection has changed since a last check was made.

If a new network connection is not detected ("NO" at 102), process 100 can return to 102 to wait for a new network connection. Otherwise, if a new network connection is detected ("YES" at 102), process 100 can move to 104 to determine if the new connection is a secure connection.

At 104, process 100 can determine if the new network connection detected at 102 is a secure connection. In some embodiments, certain classes of connection can be considered secure, while other classes of connection can be considered not secure. For example, dial-up connections, Ethernet connections, and certain encrypted wireless connections (e.g., wireless networks using Wi-Fi Protected Access (WPA) and Wi-Fi Protected Access II (WPA2)) can be considered secure connections. As another example, public wireless networks (e.g., a Public Wi-Fi Hotspot), and certain other encrypted wireless connections (e.g., wireless networks secured using Wired Equivalent Protection (WEP)) can be considered not secure. Additionally, process 100 can periodically receive updated information as new technologies are developed and/or as existing technologies become compromised, identifying types of networks and/or security protocols that are considered secure and/or identifying types of networks and/or security protocols that are considered non-secure. For example, process 100 can receive information indicating that certain types of connections are no longer recognized as secure connections, while new connection types can be added as connections that are now considered secure connections. Any suitable technique can be used to update process 100, such as updating an application that runs process 100, patching an application that runs process 100, receiving updated information in response to a query initiated by process 100, and/or any other suitable techniques.

Additionally or alternatively, in some embodiments, process 100 can evaluate security credentials (e.g., a password, pass phrase, pass code, etc.) used to access a secure network to determine security of the network connection. For example, a password can be evaluated to determine a strength of the password. In such an example, if process 100 determines that the password is weak (e.g., easy to guess or known to be compromised in some way), process 100 can consider the new connection to be a non-secure connection. In some embodiments, process 100 can cause a message to be presented to the user urging the user to adopt a stronger password, and/or process 100 can use any other suitable technique to inform the user of why the secure network connection is considered non-secure.

If the new connection is a secure connection ("YES" at 106), process 100 can move to 108 and indicate that the new connection is a secure connection. Otherwise, if the new connection is not a secure connection ("NO" at 106), process 100 can move to 110 where a connection to a virtual private network can be initiated using an encrypted signal.

At 108, process 100 can indicate that the new connection is a secure connection. For example, process 100 can cause a color of an icon (e.g., an icon in a taskbar, system tray, menu bar, etc.) to be changed to indicate that the connection is secure. As another example, process 100 can cause a color of an indicator light (e.g., an LED) to be changed to indicate that the connection is secure. More particularly, in either of the preceding examples, process 100 can cause the color of the icon or indicator light to be made blue to indicate that the connection is a secure connection. As yet another example, process 100 can cause a window to be displayed to a user indicating that the connection is secure. After indicating that the new connection is secure at 108, process 100 can return to 102 to determine if a new network connection is established.

At 110, if the new network connection is determined to not be secure at 104 and 106, process 100 can cause a secure connection to be initiated using an encrypted signal. In some embodiments, process 100 can initiate encrypted communications when it is determined that the network connection is not secure to protect any outgoing communications from a user device executing process 100 that may be intercepted on the non-secure network.

In some embodiments, process 100 can initiate a virtual private network (VPN) session at 110. For example, process 100 can cause a session between the user device and a server (also referred to herein as a VPN server or a proxy server) to be initiated using an encrypted signal in an effort to protect the communications between the user device and the server. Any suitable VPN technology can be used to establish the secure session using any suitable connection. For example, Open VPN, Layer 2 Tunneling Protocol (LT2P) or Point-to-Point Tunneling Protocol (PPTP), Internet Protocol Security (IPSec), or any other suitable VPN technology can be used to establish a VPN session between the device and the server. As described below in connection with FIG. 3, various VPN technologies can be used to attempt to establish a VPN connection and/or session if a connection cannot initially be established.

In some embodiments, a connection to the VPN can be established using a user name and password (or pass phrase, pass code, etc.). Additionally or alternatively, a token can be used in establishing a connection to the VPN. For example, a user can be assigned a token generator that generates an authentication code to be entered by the user (e.g., SecurID). As another example, a user can have a mobile device that can communicate using near-field communication (NFC) with the user device to authenticate the presence of the user at the device connecting the network. As yet another example, a user can be associated with hardware (e.g., a USB dongle) that can authenticate that the user of the user device is an authorized user. In some embodiments, any suitable combination of these and/or any other suitable security measures and/or techniques can be used in establishing and/or maintaining a connection to the VPN.

In some embodiments, multiple VPN servers at one or more geographic locations can be made available to establish a virtual private network connection. For example, in some embodiments, servers used by the mechanisms described herein to establish a virtual private network connection can be organized into clusters at various geographic locations. In general, if other factors are held constant (e.g., workload, hardware, etc.), a virtual private network connection to a server that is geographically closer provides a faster connection when acting as a proxy server (e.g., retrieving data from the Internet is faster through a VPN to a geographically closer server). Process 100 can determine which server to connect to based on the geographic location and/or the workload of each server. For example, process 100 can determine a VPN server and/or cluster of VPN servers that is located nearest geographically to a device executing process 100. In a more particular example, process 100 can query a server that includes a list of VPN server and/or cluster locations for information on the geographic locations of various VPN servers that can be used to establish a VPN connection. The list can be administered, for example, as part of a system for establishing VPN connections and can be updated manually and/or automatically. In such an example, the device executing process 100 can query the server for the entire list or can include information about the current geographic location of the device and receive a subset of VPN servers and/or clusters that are located closest to the device in response to the query.

Any suitable information about the current geographic information of the device can be used to determine a geographically nearest server and/or cluster, such as IP address of the device, location information based on GPS, network-based location information (e.g., location based on triangulation to cellular towers), and/or any other suitable location information. In some embodiments, process 100 can determine which VPN server to connect to based on a network distance to various VPN servers. For example, a distance between the device executing process 100 and each VPN server and/or cluster of servers in a routing map of a network to which both devices are connected (e.g., the Internet). In a more particular example, the network distance can be proportional to a number of nodes of the network a packet must traverse to reach the VPN server from the device executing process 100. Additionally or alternatively, process 100 can initiate a connection to a default address and can be automatically redirected to a nearest VPN server based on geographic information about the device.

In some embodiments, in addition to or in lieu of using geographic distance, any suitable load balancing techniques can be used to determine a server to connect to among multiple servers. For example, Round-robin DNS techniques can be used to determine which server to make a new connection to. As another example, the load of one or more processors in each available server can be monitored, and the result of such monitoring can be used to determine which server to make a new connection to based on the monitored load. As yet another example, as described below in connection with FIG. 2, the workload of each server that can be used with the mechanisms described herein can be monitored and a server that is determined to provide a best connection can be chosen as a server to connect to. As still another example, information about each server, such as a number of current connections, available memory, available processor capacity, and/or any other parameters that can be used to characterize workload, can be used to determine a server to connect to.

At 114, process 100 can determine if a VPN connection has been established. If a VPN connection has been established ("YES" at 114), process 100 can indicate that the new connection is now secure based on the VPN connection being established at 116. For example, process 100 can cause a color of an icon (e.g., an icon in a taskbar, system tray, menu bar, etc.) to be changed to indicate that the connection is secure. As another example, process 100 can cause a color of an indicator light (e.g., an LED) to be changed to indicate that the connection is secure. More particularly, in either of the preceding examples, the color of the icon or indicator light can be made green to indicate that the connection has been made secure by a connection over a VPN. As yet another example, process 100 can cause a window to be displayed to a user indicating that the connection is now secure by a connection over a VPN. After indicating that the new connection is now secure at 116, process 100 can return to 102 to determine if a new network connection is established.

On the other hand, if it is determined that a connection to a VPN cannot be established ("NO" at 114), process 100 can indicate that the connection is not secure at 118. For example, process 100 can cause a color of an icon (e.g., an icon in a taskbar, system tray, menu bar, etc.) to be changed to indicate that the connection is not secure. As another example, process 100 can cause a color of an indicator light (e.g., an LED) to be changed to indicate that the connection is not secure. More particularly, in either of the preceding examples, the color of the icon or indicator light can be made red to indicate that the connection has not been made secure by a connection via a VPN. As yet another example, process 100 can cause a window to be displayed to a user indicating that the connection is not secure. After indicating that the new connection is not secure at 118, process 100 can return to 102 to determine if a new network connection is established. In some embodiments, if the network connection is not secure and a connection to a VPN cannot be established, process 100 can inhibit the device from making further connections to the network as long as the connection is not secure and/or if a VPN connection cannot be established. For example, if the network is not secure (e.g., a connection to the network is through an unsecured public Wi-Fi Hotspot) and a connection to a VPN cannot be established for any reason (e.g., because a firewall at some point in the network is preventing a connection to any VPN), then the device can be prevented from connecting to the network through the non-secure connection. In some cases, a user of the device can control a setting associated with process 100 to allow non-secure connections to be made by the device. For example, process 100 can receive an instruction indicating that the user is overriding process 100, and in response process 100 can allow one or more connections to be made that are not secure.

In some embodiments, when the device is launching the mechanisms described herein (or when a connection to a VPN server is being established) process 100 can cause a color of an icon or indicator light to be yellow to indicate that a connection may not be secure. Although particular colors are described as corresponding to a security of a network, these are merely given as examples and any suitable colors and/or other indicators (such as text) can be used to indicate a security status of a network connection to the user.

Figure 2:
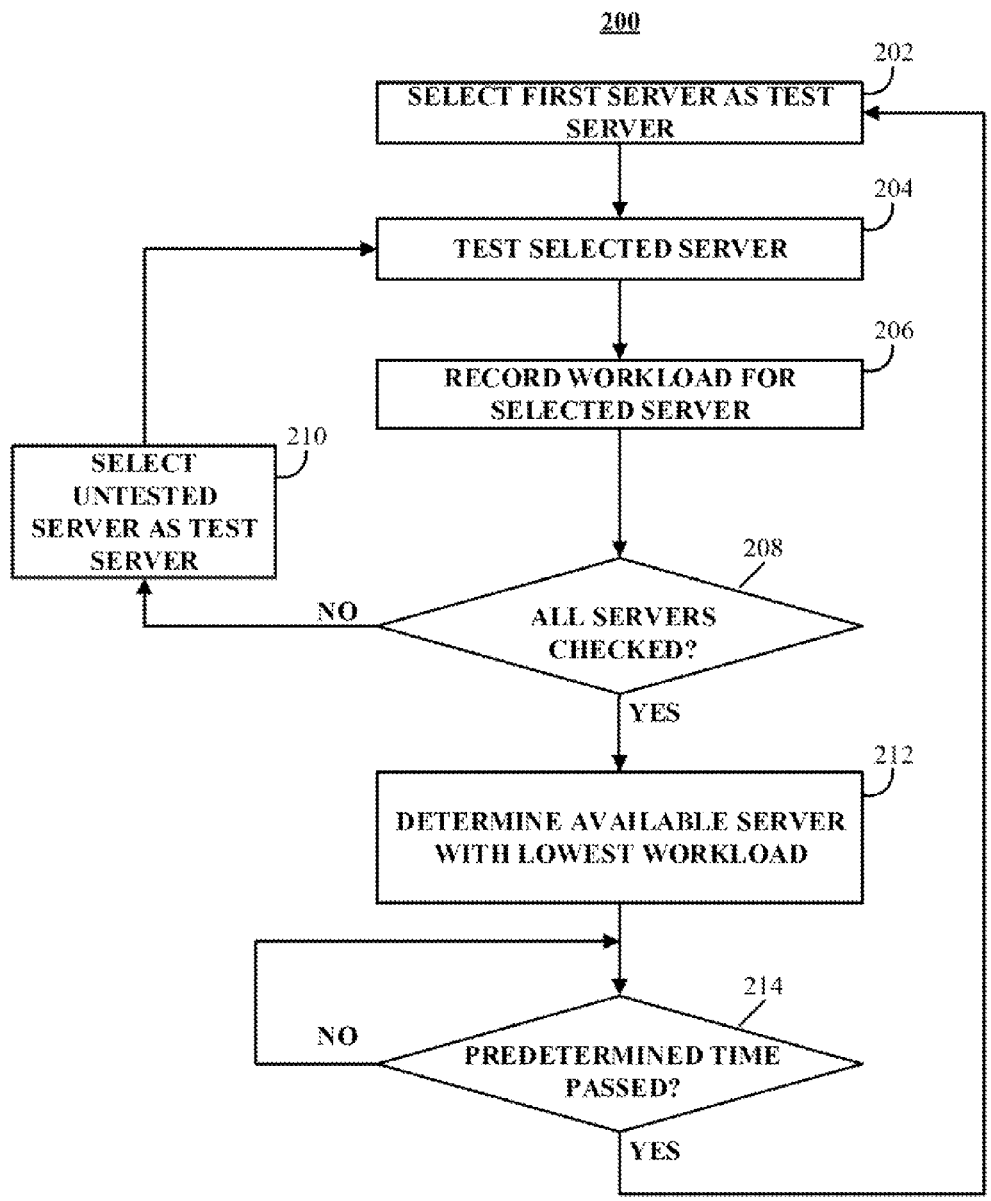
FIG. 2 shows an example of a process for determining a server to use for a virtual private network connection in accordance with some embodiments of the disclosed subject matter.

Turning to FIG. 2, an example of a process 200 for determining a server to use for a virtual private network connection is shown in accordance with some embodiments of the disclosed subject matter. In some embodiments, as described above in connection with 110 of FIG. 1, servers used by the mechanisms described herein to establish a virtual private network connection can be organized into clusters at various geographic locations. For each cluster, a monitoring server can check a workload at each server in the cluster periodically. For example, the monitoring server can access each server and simulate an intensive user session, which can include sending and retrieving significant data through the server. The amount of time it takes to complete the simulated session can be recorded and used as one factor in determining a workload of each server. For instance, a time to complete a user session based on any suitably sized file, such as a fifteen megabyte file, can be used as one factor in determining a workload of each server.

Process 200 can begin by selecting a first server in a cluster at 202. At 204, process 200 can test the server to determine the server's workload. For example, process 200 can test the server using a simulated user session as described above.

At 206, process 200 can cause the workload for the selected server to be recorded. For example, a table of workload values for each server at the cluster can be maintained and periodically updated.

At 208, process 200 can determine if an updated workload value has been calculated for each available server. For example, if a server is offline for maintenance, process 200 can proceed without checking that server's workload. If not all servers in the cluster have been checked ("NO" at 208), process 200 can move to 210 and select a server in the cluster that has not been tested, and process 200 can return to 204 to test the newly selected server. In some embodiments, all servers in a particular cluster can be tested in parallel (e.g., simultaneously), or groups of servers in a cluster can be tested in parallel.

If all servers have been checked ("YES" at 208), process 200 can move to 212 where a server with a lowest workload can be determined. In some embodiments, process 200 can identify a particular server having a lowest workload in a cluster as a preferred server in the cluster. Additionally or alternatively, at 212, process 200 can make information about the workload of each server in the cluster available to be used in determining which server to make a virtual private network connection to by a device utilizing the mechanisms described herein (e.g., by a user device executing process 100).

At 214, process 200 can determine if a predetermined time has passed since the servers in the cluster were last checked, and if the predetermined amount of time has passed ("YES" at 214), process 200 can return to 202 and begin testing the servers in the cluster again. Otherwise, if the predetermined amount of time has not passed ("NO" at 214), process 200 can return to 214 to determine if the predetermined period of time has passed. For example, after the servers in a cluster are checked, the monitoring server can wait five minutes (or any other suitable period of time) and then begin checking the servers in the cluster again. In some embodiments, the predetermined period of time can be variable and can be based on the current number of connections and/or the number of new connections being made. For example, if there are currently a large number of VPN connections open to the server (e.g., if utilization is over 50%, 60%, etc.), the predetermined amount of time can be decreased, such that workload is more closely monitored. Additionally or alternatively, regardless of whether the predetermined amount of time has passed, if a specified number of new connections is made, process 200 can cause the monitoring server to check the workload of the servers to update the workload information. Process 200 can then make the information on the workload of the servers available to a device attempting to establish a connection to a server in cases when a large number of devices establish a VPN connection to the same server in the time between workload scheduled updates.

Process 200 can be used, for example, in choosing a server to contact to establish a VPN connection at 110 in process 100. As another example, process 200 can provide information about server workload for any process used to determine a server to which a VPN connection is to be made (e.g., a process other than process 100).

Figure 3:
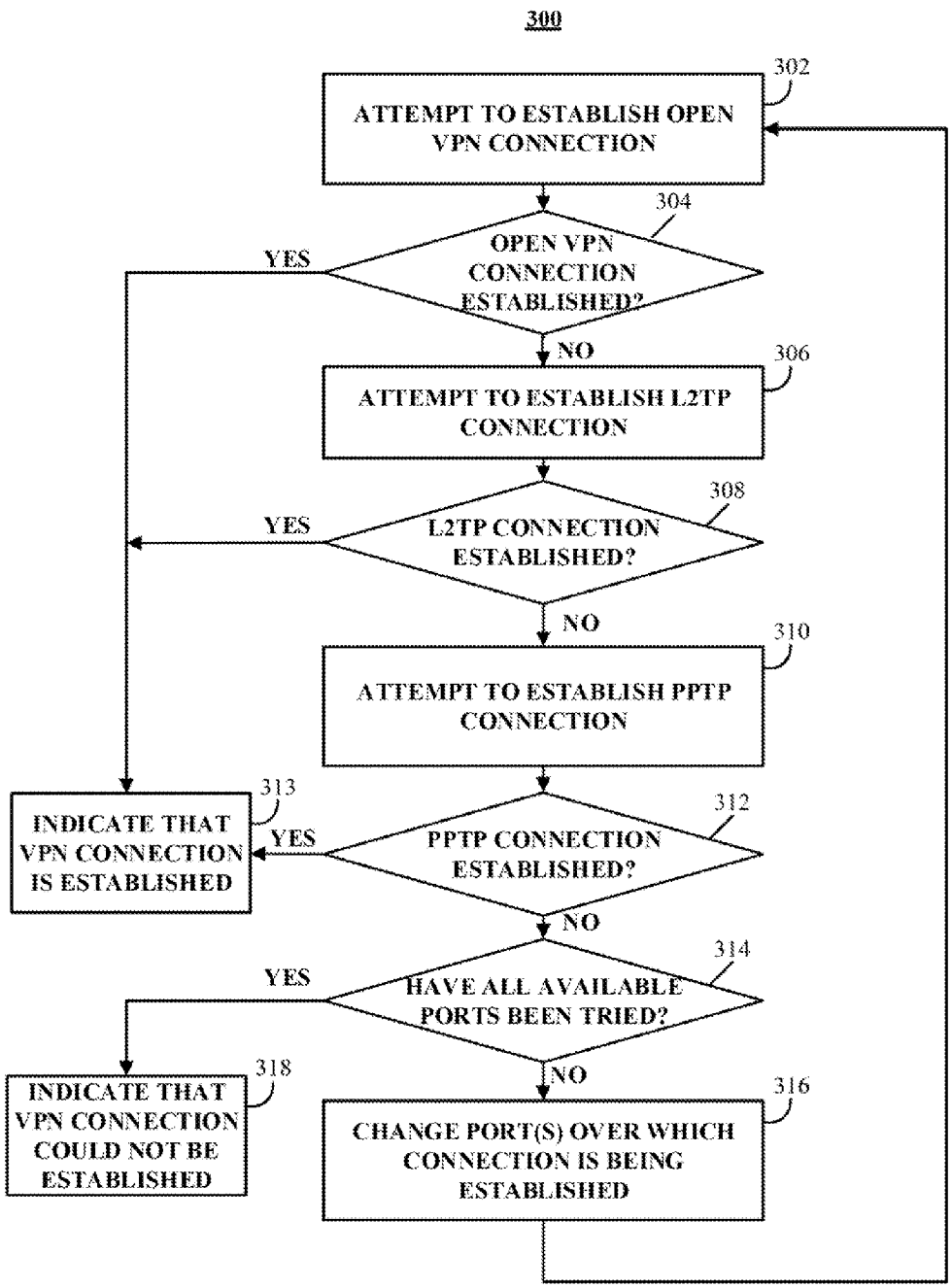
FIG. 3 shows an example of a process for determining a virtual private network technology to be used in accordance with some embodiments of the disclosed subject matter.

FIG. 3 shows an example 300 of a process for determining a VPN technology to use in establishing a VPN connection to a server in accordance with some embodiments of the disclosed subject matter. At 302, process 300 can cause an attempt to be made to establish a connection to a VPN server using an application based on OpenVPN. This attempt can be made using any suitable port, for example, port 1194 can be used to attempt to establish a connection using OpenVPN. At 304, process 300 can determine whether an OpenVPN connection is established. If an OpenVPN connection is established ("YES" at 304), process 300 can move to 313 and indicate that a VPN connection is established. Otherwise, if an OpenVPN connection is not established ("NO" at 304), process 300 can move to 306.

At 306, process 300 can cause an attempt to be made to establish a connection to a VPN server using an application based on L2TP. This attempt can be made using any suitable port, for example, port 1701 can be used to attempt to establish a connection using L2TP. At 308, process 300 can determine whether an L2TP connection is established. If an L2TP connection is established ("YES" at 308), process 300 can move to 313 and indicate that a VPN connection is established. Otherwise, if an L2TP connection is not established ("NO" at 308), process 300 can move to 310.

At 310, process 300 can cause an attempt to be made to establish a connection to a VPN server using an application based on PPTP. This attempt can be made using any suitable port, for example, port 1723 can be used to attempt to establish a connection using PPTP. At 312, process 300 can determine whether a PPTP connection is established. If a PPTP connection is established ("YES" at 312), process 300 can move to 313 and indicate that a VPN connection is established. Otherwise, if a PPTP connection is not established ("NO" at 312), process 300 can move to 314.

At 314, process 300 can determine if all available ports have been tried for each of the various VPN technologies used by the mechanisms described herein. If all available ports have been tried ("YES" at 314), process 300 can either move to 318 and indicate that a VPN was not successfully established, or try available ports again (not shown). Otherwise, if not all available ports have been tried, process 300 can cause the ports over which a connection is initiated to be changed to an alternate port (or ports) at 316. For example, each VPN server can use alternate ports through which a VPN connection can be established for each technology. In a more particular example, if an Open VPN connection is not successfully established using port 1194, an OpenVPN connection can be initiated using any other suitable port, such as port 443. This can be repeated for each alternate port available for each VPN technology. Although OpenVPN, L2TP and PPTP are described herein, any suitable technology for establishing a secure and/or encrypted connection to the Internet (or any other suitable network) can be used. For example, IPSec can be used to establish a secure connection when connected on an unsecured wireless connection. As another example, SSL can be used to establish a secure connection when connected on an unsecured wireless connection.

Figure 4:
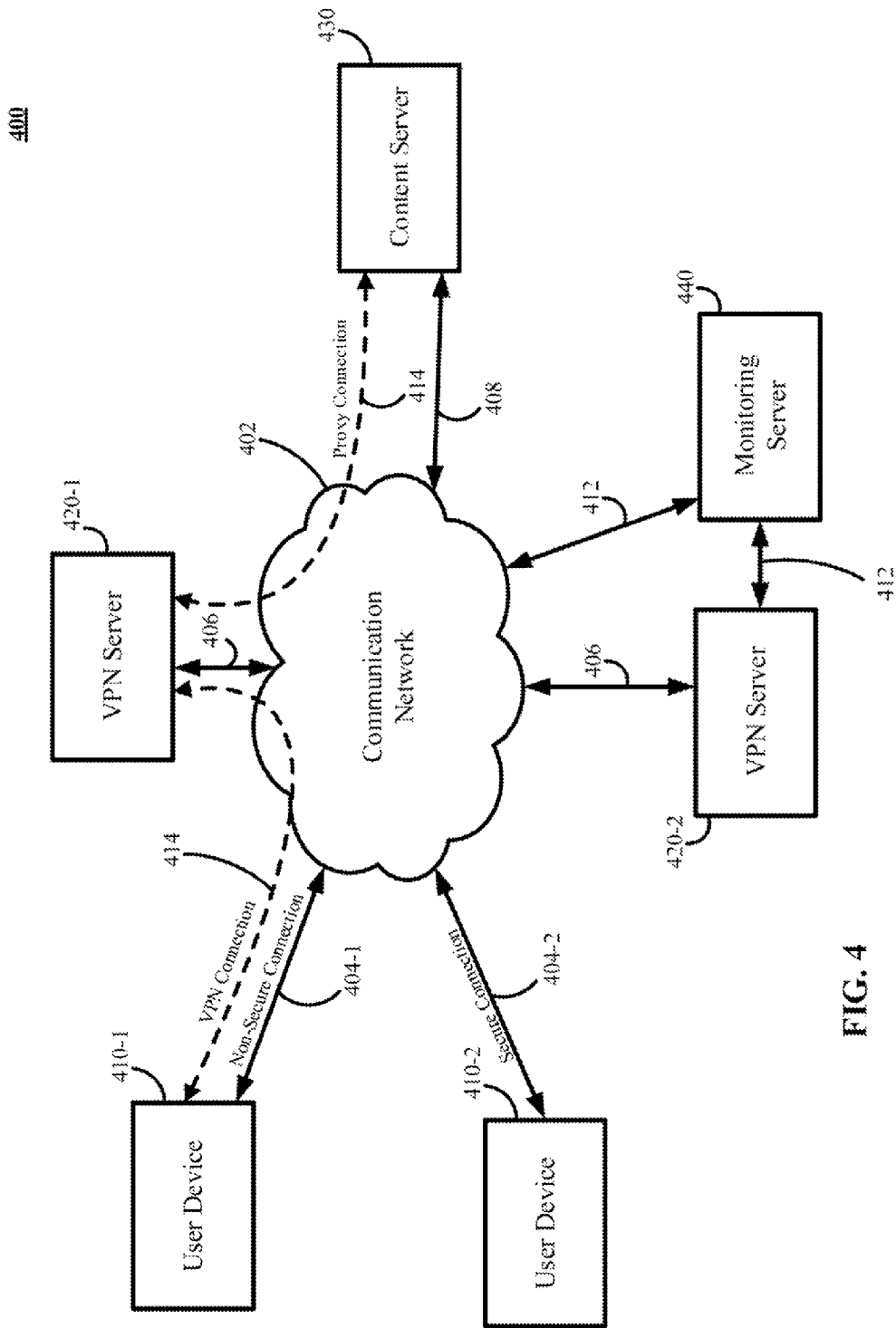
FIG. 4 shows an example of a schematic diagram of a system suitable for implementation of mechanisms described herein for secure connection management and automatic compression over metered data connections in accordance with some embodiments of the disclosed subject matter.

FIG. 4 shows an example of 400 of a generalized schematic diagram of a system on which the mechanisms for secure connection management as described herein and/or the mechanisms for automatic compression over metered data connections as described herein can be implemented in accordance with some embodiments. As illustrated, system 400 can include one or more user devices 410. User devices 410 can be local to each other or remote from each other. User devices 410 can be connected by one or more communications links 404 to a communications network 402 that can be linked via a communications link 406 to one or more VPN/proxy servers 420, one or more content servers 430 via a communications link 408, and/or one or more monitoring servers 440 via a communications link 412.

In some embodiments, each of user devices 410, VPN/proxy server 420, content server 430 and monitoring server 440 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 410 can be implemented as a personal computer, a laptop computer, a smartphone or other cellular telephone, a tablet computer, a wearable computer, a personal digital assistant, a portable music player, a portable video player, a handheld game console, a set-top box, a game console, a digital media receiver, a server computer, a router, and/or any other suitable computing device. As another example, VPN/proxy server 420 can be implemented as a server computer, a personal computer, a laptop computer, a router, a smartphone or other cellular telephone, a tablet computer, a wearable computer, a personal digital assistant, a portable music player, a portable video player, a handheld game console, a set-top box, a game console, a digital media receiver, a server computer, and/or any other suitable computing device. Content server 430 and monitoring server 440 can be implemented using any suitable computing device, such as computing devices described in connection with VPN/proxy server 420.

Communications network 402 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 404, 406, 408, and 412 can be any communications links suitable for communicating data among user devices 410, VPN servers 420, content servers 430 and monitoring server 440, such as network links, dial-up links, wireless links, hard-wired links, optical links, infrared links, any other suitable communications links, or any suitable combination of such links.

In some embodiments, system 400 can include one or more user devices 410 (e.g., 410-1 and 410-2) that can: execute processes associated with the mechanisms described herein (such as process 100 and/or process 300); establish a VPN connection with a VPN server such as VPN/proxy server 420; request content from a content server such as content server 430; request a status of various VPN servers to which a VPN connection can be established from a monitoring server such as monitoring server 430; and/or perform any other suitable actions.

In some embodiments, system 400 can include one or more VPN servers 420 that can: receive a request to establish a VPN connection from a user device, such as user device 410; receive a request from a user device to send and/or request data from a remote device such as content server 430; send and/or request data from content server 430 in response from the request received from the user device; send and/or request data from the user device in response to data received from content server 430; decrypt data received over a VPN connection from a user device; encrypt data to be sent to the user device; and/or perform any other suitable actions.

In some embodiments, system 400 can include one or more content servers 430 that can: receive request for content from a device such as user device 410, VPN/proxy server 420 and/or any other suitable device; send data in response to a request for content; and/or perform any other suitable actions. In some embodiments, content server 430 can be a web content server that hosts web pages, a music hosting server that hosts music files, an image hosting server that hosts image files, and/or any other suitable server for storing any other suitable content.

In some embodiments, system 400 can include one or more monitoring servers 440 that can: execute process 200 as described above in connection with FIG. 2; receive a request from a user device for an identity of a VPN server to establish a connection with; maintain information on workload information for various VPN servers; and/or perform any other suitable actions. Monitoring servers 440 can communication with VPN servers using communications links 412 over communications network 402 (e.g., if the VPN server is located remotely from monitoring server 440) and/or directly (e.g., if the VPN server is located locally and communications link 412 is a suitable direct link).

As shown in FIG. 4, user device 410-1, which can be executing process 100, is connected to communication network 402 by communications link 404-1 which includes a connection that is not a secure connection (e.g., as described above in connection with process 100 of FIG. 1). As described above in connection with 110 of FIG. 1, process 100 can initiate a virtual private network connection (such as VPN connection 414) to a VPN server (such as VPN/proxy server 420-1) in response to determining that the connection over communication link 404-1 is not secure. As described above, VPN connection 414 can be established with VPN/proxy server 420-1 rather than another VPN server (such as VPN/proxy server 420-2) for any suitable reason, such as the workload of VPN/proxy server 420-1 being reported by monitoring server 430 to be lower than the workload of VPN/proxy server 420-2. After establishing VPN connection 414, user device 410-1 can use VPN/proxy server 420-1 to request content from content server 430 via a proxy connection to content server 430.

As also shown in FIG. 4, user device 410-2, which can be executing process 100, is connected to communication network 402 by communications link 404-2 which includes a connection that is a secure connection (e.g., as described above in connection with process 100 of FIG. 1). As described above in connection with 108 of FIG. 1, process 100 can cause an indication to be presented to a user of user device 410-2 that the connection is secure, and the user device can communication using communications network 402 normally without process 100 initiating a virtual private network connection.

Figure 5:
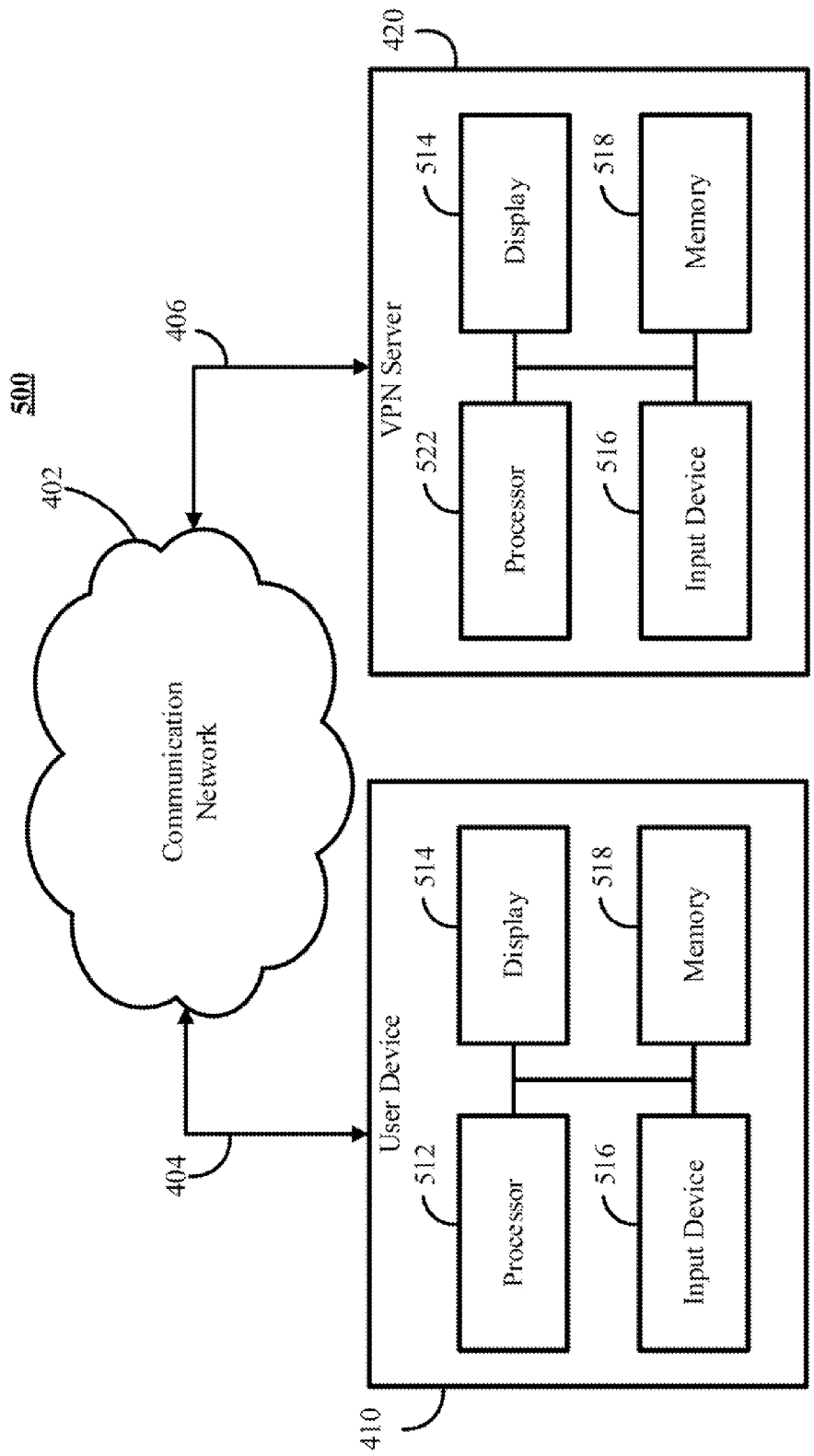
FIG. 5 shows an example of a user device and virtual private network server of FIG. 4 that can be used in accordance with some embodiments of the disclosed subject matter.

FIG. 5 illustrates an example 500 of hardware that can be used to implement one of user device 410 and server 420 depicted in FIG. 4 in accordance with some embodiments of the disclosed subject matter. Referring to FIG. 5, user device 410 can include a hardware processor 512, a display 514, an input device 516, and memory 518, which can be interconnected. In some embodiments, memory 518 can include a storage device (such as a non-transitory computer-readable medium) for storing a computer program for controlling hardware processor 512.

Hardware processor 512 can use the computer program to present on display 514 a user interface for presenting various visual information to a user, such as an indication of whether a current network is secure, as well as any other suitable visual information. It should be noted that data received through communications link 404 or any other communications links can be received from any suitable source such as VPN/proxy server 420, content server 430, and/or any other suitable source. In some embodiments, hardware processor 512 can send and receive data through communications link 404 or any other communication links using, for example, a transmitter, receiver, transmitter/receiver, transceiver, or any other suitable communication device, such as transmitter/receiver. Display 514 can include, a flat panel display, a touchscreen display, a projector, a cathode ray tube display, a video output port, a speaker(s), and/or any other suitable display and/or presentation devices. Input device 516 can include any suitable input device such as a computer keyboard, a computer mouse, a microphone, a touchpad, a voice recognition circuit, a touch interface of a touchscreen, and/or any other suitable input device.

VPN/proxy server 420 can include a hardware processor 522, a display 524, an input device 526, and memory 528, which can be interconnected. In some embodiments, memory 528 can include a storage device (such as a non-transitory computer-readable medium) for storing a server program for controlling hardware processor 522.

Hardware processor 522 can use the server program to communicate with user devices 410 to, for example, establish a VPN connection, receive request for data from a particular address, transmit data received from the address, and/or perform any other suitable functions. It should be noted that data received through communications link 406 or any other communications links can be received from any suitable source, such as user device 410, content server 430, monitoring server 440, and/or any other suitable device. In some embodiments, hardware processor 522 can send and receive data through communications link 406 or any other communication links using, for example, a transmitter, receiver, transmitter/receiver, transceiver, or any other suitable communication device. Display 524 can include a flat panel display, a touchscreen, a projector, a cathode ray tube display, a video output port, a speaker(s), and/or any other suitable display and/or presentation devices. Input device 526 can include a computer keyboard, a computer mouse, a microphone, a touchpad, a voice recognition circuit, a touch interface of a touchscreen, and/or any other suitable input device.

Content server 430 and/or monitoring server 440 can include components similar to those described in connection with VPN/proxy server 420 and/or user device 410.

In accordance with various embodiments, mechanisms for automatic compression over metered data connections are provided. These mechanisms can include automatically determining whether a device's connection to a network is a metered connection and automatically using a proxy server to facilitate compression of content sent over the metered connection. Using these mechanisms for automatic compression over metered data connections, the amount of data sent over the metered connection can be automatically reduced. As user herein, compression can include any suitable technique or combination of techniques for reducing the amount of data that is sent over a connection, which can include lossless compression techniques and/or lossy compression techniques. For example, as used herein, compression can include reducing the resolution of an image that is sent over a connection, downsampling of a signal, and/or any other suitable techniques.

These mechanisms can be used in a variety of applications. For example, these mechanisms can be used to compress text, images, video and/or any other suitable data that is sent to and/or from a mobile device over a metered data connection, such as a cellular data connection. In such an example, transmission of data over the metered connection can be reduced, which can save a user money and/or allow the user to make greater use of the metered connection (e.g., by downloading more content) without paying more for an increased allotment of data. In a more particular example, a device, such as a laptop computer, a smartphone, a tablet computer, etc., can be connected to the Internet over a metered cellular data connection using the mechanisms described herein to automatically compress, at a proxy server, data that is received from a content server and cause the compressed data to be sent to the device over the metered connection. As another example, the content included in data that is transmitted over the metered connection can sometimes be received more quickly because the content is transmitted using less total data (e.g., an image with a smaller overall file size can sometimes be received and presented more quickly than an image with a larger overall file size).

In some embodiments, the device can send and/or receive all data over a metered connection using the proxy server, such that substantially all traffic to and from the device is compressed when sent over the metered connection. Additionally or alternatively, the device can appear to be assigned a new Internet Protocol address (IP address) when the device connects to the proxy server.

Figure 6:
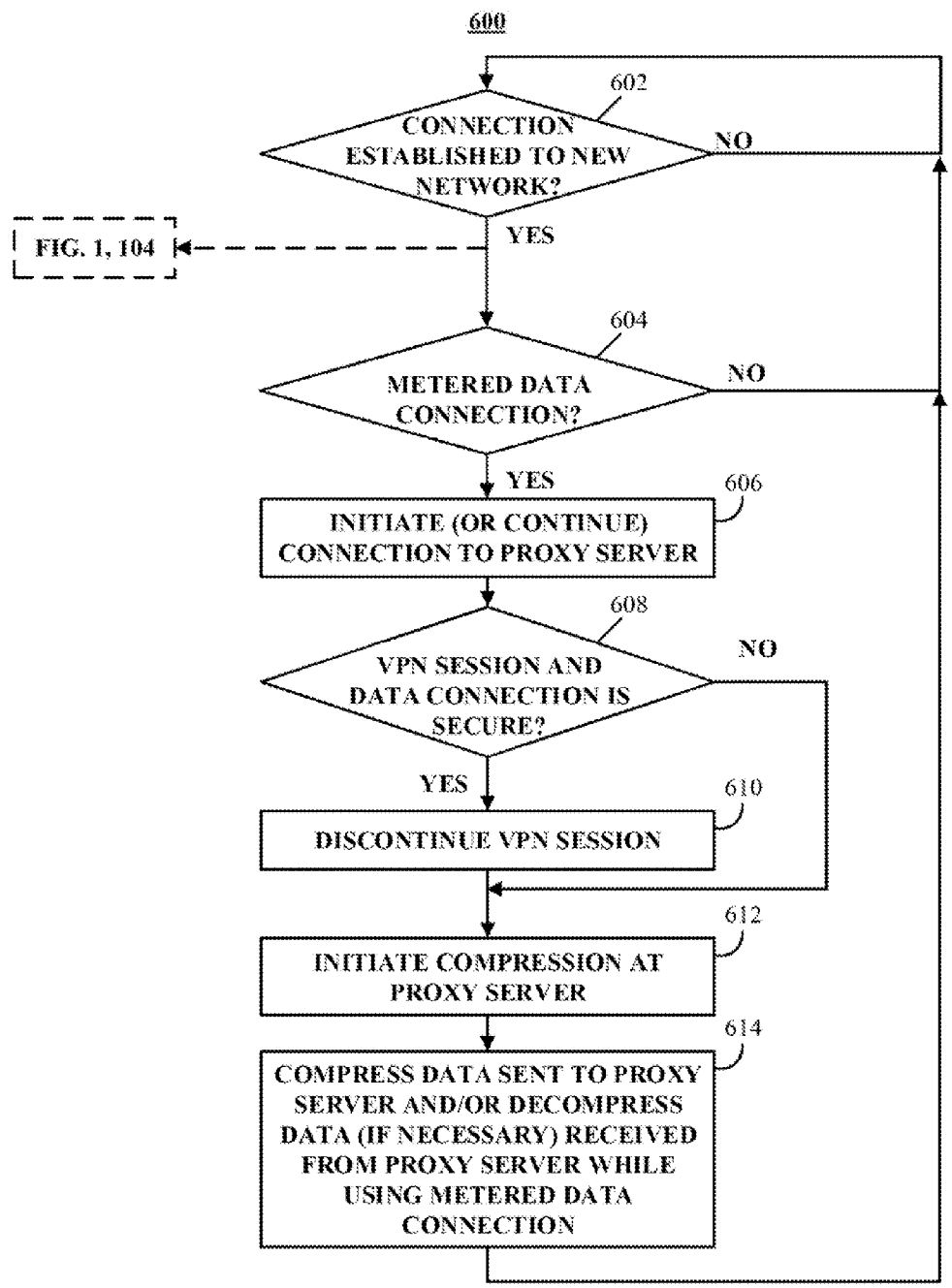
FIG. 6 shows an example of a process for automatic compression over metered data connections in accordance with some embodiments of the disclosed subject matter.

Turning to FIG. 6, an example 600 of a process for automatic compression over metered data connections is shown in accordance with some embodiments of the disclosed subject matter. In some embodiments, process 600 can be initiated at any suitable time and/or in response to any suitable condition or conditions. For example, similarly to what is described above in connection with process 100 of FIG. 1, process 600 can be initiated in response to a user device being powered on, and can run on the user device to determine if a new network connection has been established and whether that new network connection is a metered data connection (e.g., such as a cellular data connection). For example, a laptop computer can initiate process 600 when the computer is powered on and can run process 600 in the background. As another example, process 600 can be initiated in response to a user selecting to initiate process 600. In a more particular example, process 600 can be included as part of an application installed on the user device, and the user can start the application to initiate process 600. As another example, process 600 can be included as part of an operating system and/or an application installed on the user device and can be initiated based on settings of the user device and/or the application. In a more particular example, process 600 can be initiated when a network connection is enabled on the user device that executes process 600 (e.g., when a Wi-Fi connection is enabled, when a cellular connection is enabled, when an "airplane mode" is disabled, etc.). In another more particular example, process 600 can be initiated when the user device enters and/or exits a particular location (e.g., when the user device exits an area designated as a user's home, work, etc.). In some embodiments, process 600 can determine whether a user has entered and/or exited a particular location using any suitable technique or combination of techniques, such as using location data, signal strength from a Wi-Fi network (e.g., a home Wi-Fi network, a work Wi-Fi network, etc.).

At 602, process 600 can determine if a new network connection has been made by the device executing process 600. In some embodiments, process 600 can determine whether a new network connection has been established using any suitable technique or combination of techniques. For example, similarly to what is described above in connection with process 100 of FIG. 1, process 600 can intercept an instruction to establish a new network connection. As another example, process 600 can query a user device executing process 600 to determine whether a new network connection has been made (e.g., by requesting information related to a current network connection and comparing it to previous information provided by the user device related to a then-current network connection).

If a new network connection is not detected ("NO" at 602), process 600 can return to 602 to wait for a new network connection. Otherwise, if a new network connection is detected ("YES" at 602), process 600 can move to 604 to determine if the new connection is a metered connection. Note that in some embodiments, when process 100 and 600 are being performed in a device, one of 102 and 602 can be omitted and process 600 can begin at 604 from 102 when a new network connection is detected using process 100, process 100 can begin at 104 from 602 when a new network connection is detected using process 600, or 102 and 602 can both be performed by a user device as parts of separately executed processes.

At 604, process 600 can determine if the new network connection is a metered data connection. In some embodiments, process 600 can use any suitable technique or combination of techniques to determine whether the new network connection is a metered connection. As used herein, a metered network connection can be any connection for which a provider associated with the connection charges based on the amount of data usage, limits bandwidth when a data usage cap is exceeded (e.g., by "throttling" of the connection), levies overage charges when a data usage cap is exceeded, and/or is otherwise limited based on usage. For example, process 600 can determine whether the new connection is a metered cellular connection. In a more particular example, process 600 (or any other suitable process) can receive user input indicating that the cellular connection used by a user device executing process 600 is a metered cellular connection. In some embodiments, such user input can include identifying information of a cellular data provider for the computing and/or identifying information of a rate plan associated with the user device. As another example, process 600 can determine whether the new connection is a metered Wi-Fi connection (e.g., such as in-flight Wi-Fi connections on some air carriers, a Wi-Fi connection to a wireless "hot spot" that uses a metered wireless network connection, etc.). In some embodiments, when a connection is established to a new network, process 600 can prompt the user to input information that can be used to determine whether the new connection is a metered connection. In some embodiments, when a connection is established to a new network, process 600 can check settings of the user device and/or of an application that executes at least a portion of process 600 to determine whether the new connection is a metered connection. Additionally or alternatively, process 600 (and/or any other suitable process) can automatically determine whether the new connection is a metered connection (e.g., based on one or more properties of the connection). Note that although cellular and Wi-Fi connection are generally described herein as network connections over which a user device, such as a mobile user device, send and/or receive data, the mechanisms described herein can be used with any suitable network connection. For example, the mechanisms described herein can be used with satellite communication networks, wired communication networks, and/or any other suitable communication network.

If the new network connection is not a metered connection ("NO" at 604), process 600 can return to 602 to wait for a new network connection. Otherwise, if the new network connection is a metered connection ("YES" at 604), process 600 can move to 606 to initiate a connection to a proxy server.

At 606, process 600 can initiate a connection to a proxy server. In some embodiments, the proxy server with which the connection is initiated can be selected using process 200, and/or any other suitable process. In some embodiments, process 600 can use any suitable technique or combination of techniques to initiate the connection to the proxy server. In some embodiments, in which a connection to the proxy server is already established (e.g., when a VPN connection is established to the proxy server), process 600 can continue the connection to the proxy server and/or determine whether a connection to a different proxy server is to be made.

At 608, process 600 can determine if the metered data connection is a secure connection (e.g., a cellular connection, or another type of secure connection described above in connection with 104 of FIG. 1) and, in some embodiments, can determine if an active VPN connection is currently established between the user device and a proxy server (e.g., in accordance with process 100 described above in connection with FIG. 1).

If the new network connection is not a secure connection or a VPN connection is not currently established with the proxy server ("NO" at 608), process 600 can move to 612. Otherwise, if the new network connection is secure and a VPN connection is currently established with the proxy server ("YES" at 608), process 600 can move to 610.

At 610, process 600 can cause a currently established VPN connection to be discontinued. In some embodiments, process 600 can use any suitable technique or combination of techniques to cause the VPN connection to be discontinued. Additionally, in some embodiments, a connection to the proxy server that was used to establish the VPN connection can be maintained and used as described below in connection with 612 to compress data sent to and/or from the user device.

At 612, process 600 can initiate compression of data transmitted to and/or from the user device over the metered data connection. In some embodiments, process 600 can use any suitable technique or combination of techniques to initiate compression of data transmitted to and/or from the user device over the metered data connection. In some embodiments, in which outgoing data is compressed the user device executing process 600 can begin compressing data intended for a particular destination using any suitable mechanism and/or technique for compressing the data. In such embodiments, process 600 can cause the user device to send the compressed data to the proxy server where it can be decompressed and sent on to a destination specified by the user device (e.g., a website, an email server, a messaging server, etc.).

At 614, process 600 can compress data that is to be sent, via the proxy server, to one or more destinations, and/or can receive data from the one or more destinations, via the proxy server, that was compressed at the proxy server. The user device and/or proxy server can use any suitable compression technique or combination of compression techniques, and can compress any suitable data that is sent to and/or from the user device. In some embodiments, compression techniques can include techniques for lossless compression and/or techniques for lossy compression. For example, in some embodiments, the proxy server can use one more lossless compression techniques, such as by formatting different types of data using one or more lossless compression techniques that are appropriate for that type of data. In a more particular example, image data can be compressed using the Portable Network Graphics (PNG) format. In a more particular example, text data (such as HTML data) can be compressed using the GZIP format. As another example, in some embodiments, the proxy server can use one or more lossy compression techniques, such as scaling images to a lower resolution, formatting images that are not already in JPEG format into JPEG format, etc. In a more particular example, the proxy server can use one or more lossy compression techniques to reduce the amount of data included in content that is sent to a user device executing process 600, without requiring any additional decompression at the user device (e.g., other than decompression of compressed content formats such as JPEG, MPEG, etc.). In another more particular example, the proxy server can use an application, such as Ziproxy, available from ziproxy(dot)sourceforge(dot)net/index(dot)html. In such an example, the application can scale images to a lower resolution, compress text using compression techniques such as GZIP, and optimize code (e.g., HTML code, JavaScript code, Cascading Stle Sheets code, etc.) using any suitable optimization techniques (e.g., minification).

In some embodiments, in cases in which the compressed data that is received from the proxy server is in a usable format (e.g., in a format that does not require decompression other than what is required by the format itself), a user device can present content included in the compressed data without performing any decompression other than what is required by a format of the content. For example, a user device executing process 600 can receive a lower resolution JPEG file which has been compressed using lossy compression techniques to downsample a higher resolution JPEG file received at the proxy server from the content server, thereby reducing the resolution of the image included in the JPEG file sent over the metered data connection. In such an example, the user device can use the received JPEG file without performing decompression other than decompression already required to use files encoded in the JPEG file format. Alternatively, in an example in which all data sent over the metered data connection is encoded using one or more compression techniques, the user device can decompress the received data using one or more corresponding decompression techniques prior to using the content included in the data. In a more particular example, if a JPEG file is included in data that is encoded using one or more compression techniques, the user device first decompresses the compressed data using the one or more corresponding decompression techniques, then the JPEG file can be decompressed (e.g., by a browser application) in order to present the image included in the received JPEG file. Additionally, in some embodiments, a process for providing a VPN connection via the proxy server (e.g., as described above in connection with process 100 of FIG. 1) can also perform compression on the encrypted data sent to and/or from the proxy server (e.g., using LZO compression techniques). In some embodiments, process 600 can use additional and/or different compression techniques as those performed in connection with the VPN connection. For example, in some embodiments, LZO compression techniques can be used on data that is sent over the VPN connection, and one or more other compression techniques (e.g., scaling of images, compression of text using GZIP, etc.) can be used by the proxy server for sending data over a metered data connection.

In some embodiments, substantially all data that is received from and/or sent to the proxy server can be compressed. For example, as data intended for a user device executing process 600 is received by the proxy server, the data can be compressed prior to sending the data on to the user device. In some embodiments, substantially all data can be compressed using the same compression technique or combination of techniques. Alternatively, the proxy server can compress data of different types of content using different techniques. For example, the proxy server can compress video content using a different compression technique than is used to compress other content. Alternatively, in some embodiments, certain types of data can be compressed using any suitable technique or combination of techniques, while other data can be uncompressed. For example, in some embodiments, image data can be compressed at the proxy server before sending the data over a data connection to a user device, while text data can be sent without compression at the proxy server before sending the data over a data connection to a user device.

In some embodiments, process 600 can continue to use the proxy server to compress data sent over the metered data connection until a new connection is detected at 602, at which point process 600 can determine whether the new connection is metered or unmetered and can continue or discontinue compression accordingly. Although process 600 has generally been described as being performed by a user device, one or more portions of process 600 can be performed remotely (e.g., by proxy server 420). For example, a proxy server can periodically (at regular and/or irregular intervals) receive information related to a current network connection of a user device, and can determine whether the connection is a metered connection at 604. The proxy server can then initiate a connection to the user device and/or compression of data sent to the user device, rather than such a connection between the user device and the proxy server and/or compression of data sent to the user device from the proxy server being initiated by the user device.

In some embodiments, the proxy server can also remove advertisement content included in the content received by the proxy server from the content server prior to sending the content on to the user device. Any suitable technique or combination of techniques can be used to remove the advertising content. For example, techniques which filter advertisements based on the source address of the content can be used to inhibit advertisements from being loaded by the user device. In a more particular example, techniques associated with advertisement blocking software can be used to inhibit certain advertisements from being loaded by the user device, such as ADBLOCK PLUS, available from adblockplus(dot)org. In some embodiments, certain advertisements that are likely to include a relatively large amount of data (e.g., advertisements that are likely to include images, video, audio, etc.) can be inhibited at the proxy server, while advertisements that are likely to include a relatively small amount of data (e.g., text-based advertisements) can at least be inhibited from being presented at the user device. In cases in which the user device executing process 600 is receiving data using a metered data connection, removing such advertising content can further reduce the amount of data that is transmitted over the metered data connection.

Figure 7:
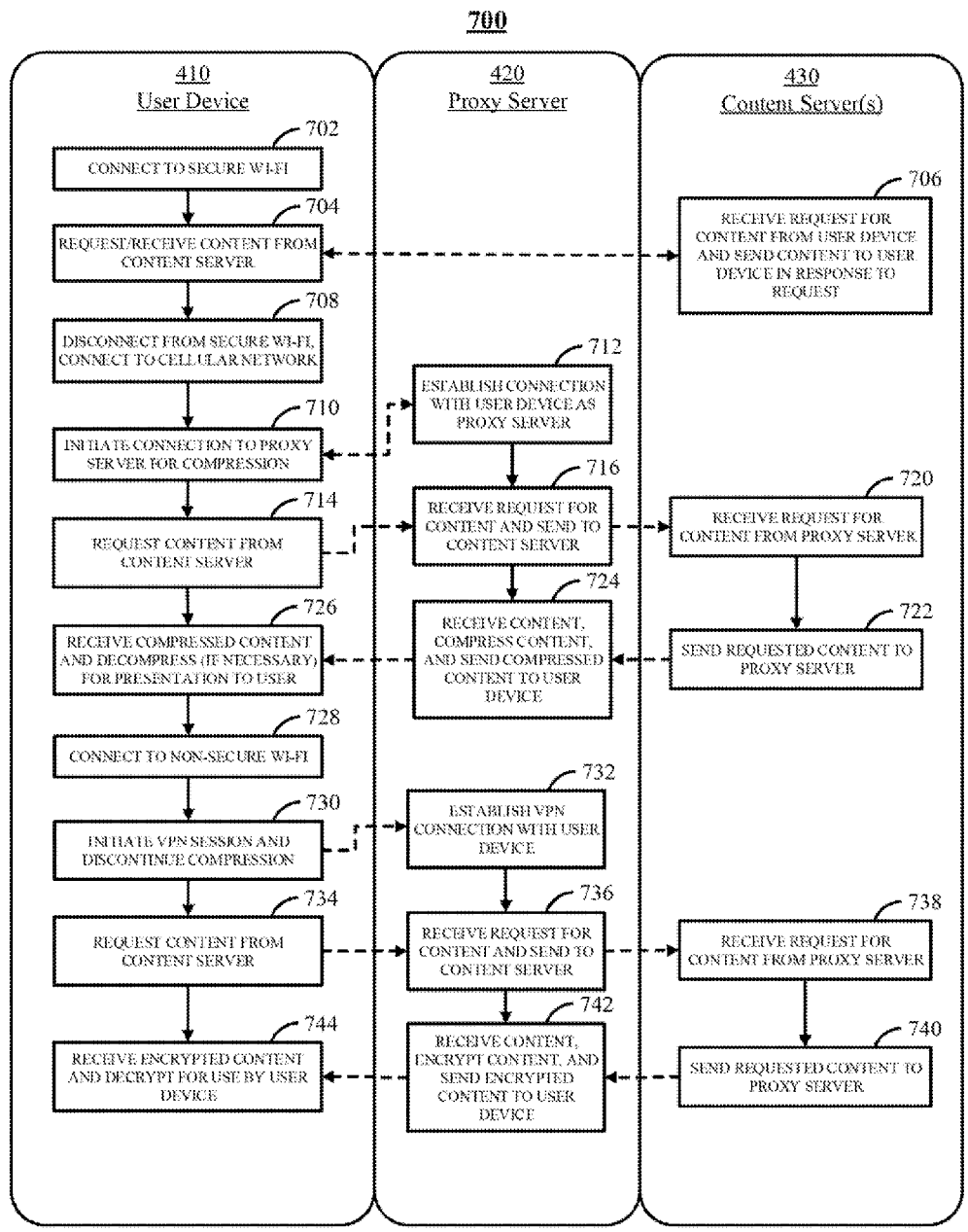
FIG. 7 shows an example of a data flow that can be used in conjunction with the processes described in connection with FIGS. 1 and 6 to manage initiation and/or use of a virtual private network connection and automatic compression of data sent over metered data connections in accordance with some embodiments of the disclosed subject matter.

FIG. 7 shows an example of a data flow 700 that can be used in conjunction with the processes described above in connection with FIGS. 1 and 6 to manage initiation and use of a VPN connection and automatic compression of data sent over metered data connections in accordance with some embodiments of the disclosed subject matter. At 702, user device 410 can connect to a secure Wi-Fi connection (e.g., as described above in connection with 102 of FIG. 1), and upon detecting that the Wi-Fi connection established at 702 is secure (e.g., as described above in connection with 104 of FIG. 1), can receive and/or request content from one or more content servers 430 over the secure Wi-Fi connection at 704 without establishing a VPN connection with proxy server 420 and without using proxy server 420 to compress data that is sent over the secure Wi-Fi connection.

At 706, one or more content servers 430 can receive one or more requests for content from user device 410 (e.g., via the Internet) and/or can send content (e.g., via the Internet) to user device 410 in response to the request.

At 708, user device 410 can disconnect from the secure Wi-Fi network to which it was connected at 702 (e.g., upon a signal strength of a signal from an access point associated with the secure Wi-Fi network falling below a threshold signal strength, upon user input being received to disconnect from the secure Wi-Fi network, upon Wi-Fi connections being disabled on the user device for any reason, etc.), and can initiate a connection to a cellular network associated with the user device (e.g., a cellular network associated with a particular wireless carrier). Upon detecting that user device 410 is connected to a cellular network (and/or determining that the cellular connection is a metered connection), user device 410 can initiate a connection to proxy server 420 to facilitate compression of data that is sent to and/or from user device 410.

At 712, proxy server 420 can establish a connection with user device 410 to act as a proxy server for user device 410. In some embodiments, upon the connection between proxy server 420 and user device 410 being established, user device 410 can cause information to be communicated to one or more servers that provide push notifications (and/or any other suitable data sent using a push model) to inform those one or more servers as to how to address notifications and/or any other suitable data intended for user device 410. Any suitable technique or combination of techniques can be used to establish such a proxy connection.

At 714, user device 410 can send a request to proxy server 420 for content that is intended for content server 430. In some embodiments, this request can be compressed by user device 410 prior to sending the request over the cellular data connection.

At 716, a request for content from content server 430 can be received by proxy server 420, and sent on to content server 430. In some embodiments, where the request is compressed, proxy server 420 can decompress the request prior to sending it on to content server 430.

At 720, content server 430 can receive the request for content from proxy server 420, and at 722 can send the requested content back to proxy server 420 (assuming that proxy server 420 is authorized to access the content, e.g., based on a username and password, a security token, geographic restrictions, etc.).

At 724, proxy server 420 can receive the requested content from content server 430, which is compressed and sent to user device 410 as the requested content.

At 726, user device 410 can receive the compressed requested content, and can (if required) decompress the content for presentation to a user of user device 410, and/or for any other suitable purpose.

At 728, user device 410 can connect to a non-secure Wi-Fi network (e.g., a public Wi-Fi network) as described above in connection with process 100 of FIG. 1. Upon detecting that user device 410 is connected to a non-secure Wi-Fi network, at 730, user device 410 can initiate a VPN connection with proxy server 420 (which may be the same proxy server or a different proxy server than the proxy server used to perform compression at 724). In some embodiments, user device 410 can also discontinue compression at 730.

At 732, proxy server 420 can establish a VPN connection with user device 410 (e.g., as described above in connection with 112 of FIG. 1).

At 734, user device 410 can request content from one or more content servers 430 via proxy server 420. As described above, such a request can be encrypted in accordance with the VPN connection established at 730 and 732.

At 736, proxy server 420 can receive the request for content directed to content server 430 from user device 410. Proxy server 420 can perform any suitable decryption to the request, and can send the request to content server 430.

At 738, content server 430 can receive the request for content from proxy server 420, and, at 740, can send the requested content back to proxy server 420 (assuming that proxy server 420 is authorized to access the content, e.g., based on a username and password, a security token, geographic restrictions, etc.).

At 742, proxy server 420 can receive the content from content server 430, encrypt the content in accordance with the VPN connection established between user device 410 and proxy server 420, and send the encrypted content to user device 410 over at least the unsecure Wi-Fi network.

At 744, user device 410 can receive the encrypted content and decrypt the content for presentation to a user of user device 410, and/or for any other suitable purpose.

Note that the data flow in FIG. 7 is merely an example, and compression by proxy server 420 and/or a VPN connection established between user device 410 and proxy server 420 can be used in any suitable order, in any suitable combination, and/or in response to any suitable circumstances in accordance with the mechanisms described herein for secure connection management and automatic compression over metered data connections. Additionally, note that although content is generally described in FIG. 7 as being sent from content server 430 in response to a request for the content, data can be sent from content server 430 (and/or any other suitable server) for user device 410 without such a request being received. For example, a server can send content that is to be pushed to user device 410 without a request for that content being sent, but rather based on a setting indicating that such content is to be sent to user device 410.

In some embodiments, the mechanisms described herein can include server-side software, client-side software, server-side hardware, client-side hardware, firmware, or any suitable combination thereof. For example, these mechanisms can encompass one or more computer programs that cause a hardware processor to execute the mechanisms described herein (e.g., the hardware processor can be programmed to execute the mechanisms described herein). For instance, these mechanisms can encompass a computer program written in a programming language recognizable by user device 410, VPN/proxy server 420 and/or monitoring server 440 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 1-3, 6 and 7 can be executed or performed in any order or sequence not limited to the order and sequence shown and described in the figures. Also, some of the above steps of the processes of FIGS. 1-3, 6 and 7 can be executed or performed substantially simultaneously where appropriate or in parallel to reduce latency and processing times. Furthermore, it should be noted that FIGS. 1-3, 6 and 7 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for secure connection management and automatic compression over metered data connections are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for facilitating compression over a metered data connection, the method comprising:
   detecting, using a hardware processor of a user device, a first new wireless network connection;
   determining, using the hardware processor of the user device, that the first new wireless network connection is a metered data connection;
   sending, via a proxy server, one or more requests for content to at least one remote content server using the metered data connection in response to determining that the first new wireless connection is a metered data connection;
   receiving, via the proxy server, content from the content server using the metered data connection, wherein the content is compressed by the proxy server;
   determining, using the hardware processor of the user device, that the first new wireless network connection is a secure connection;
   upon determining that the first new wireless network connection is a secure connection, indicating to a user that the first new wireless network connection is secure;
   detecting, using the hardware processor of the user device, a second new wireless network connection;
   determining, using the hardware processor of the user device, that the second new wireless network connection is a non-secure wireless connection;
   determining, using the hardware processor of the user device, that the second new wireless network connection is not a metered data connection;
   causing the proxy server to inhibit compression of content sent to the user device in response to determining that the second new wireless network connection is not a metered data connection;
   causing, using the hardware processor of the user device, information sent by the user device over the second new wireless network connection to be encrypted in response to determining that the second new wireless network connection is not secure;
   establishing, the hardware processor of the user device, a virtual private network connection between the user device and a virtual private network server using encrypted information sent over the second new wireless network connection in response to determining that the second new wireless network connection is not secure;
   upon establishing the virtual private network connection, indicating, using the hardware processor of the user device, to the user that the second new wireless network connection is secure based on the virtual private network connection being established; and
   receiving, using the hardware processor of the user device, content from the at least one remote content server over the second new wireless network connection as encrypted information from the virtual private network server.

2. The method of claim 1, wherein the metered data connection is a cellular data connection.

3. The method of claim 1, wherein the proxy server and the virtual private network server are the same computing device.

4. The method of claim 1, further comprising receiving at the user device, via the proxy server, pushed content from a server, wherein the pushed content was sent by the server without a request for the content from the user device and wherein the pushed content is compressed in the one or more compression formats associated with the proxy server.

5. The method of claim 1, wherein determining that the first new wireless network connection is a metered data connection comprises receiving user input related to the first new wireless connection, and wherein the method further comprises determining based on the user input that the first new wireless connection is a metered connection.

6. The method of claim 1, further comprising:
   detecting, using the hardware processor of the user device, a third new wireless network connection;
   determining, using the hardware processor of the user device, that the third new wireless network connection is the metered data connection;
   determining, using the hardware processor of the user device, that the third new wireless network connection is a secure connection;
   determining that the virtual private network connection is established with the virtual private network server; and
   upon determining that the first new wireless network connection is a secure connection and that the virtual private network connection is established with the virtual private network server, discontinuing the virtual private network connection.

7. A system for facilitating compression over a metered data connection, the system comprising:
   a hardware processor of a user device programmed to:
      detect a first new wireless network connection;
      determine that the first new wireless network connection is a metered data connection;
      send, via a proxy server, one or more requests for content to at least one remote content server using the metered data connection in response to determining that the first new wireless connection is a metered data connection;
      receive, via the proxy server, content from the content server using the metered data connection, wherein the content is compressed by the proxy server;
      determine, using the hardware processor of the user device, that the first new wireless network connection is a secure connection;
      upon determining that the first new wireless network connection is a secure connection, indicate to a user that the first new wireless network connection is secure;
      detect a second new wireless network connection;
      determine that the second new wireless network connection is a non-secure wireless connection;
      determine that the second new wireless network connection is not a metered data connection;
      cause the proxy server to inhibit compression of content sent to the user device in response to determining that the second new wireless network connection is not a metered data connection;
      cause information sent by the user device over the second new wireless network connection to be encrypted in response to determining that the second new wireless network connection is not secure;
      establish a virtual private network connection between the user device and a virtual private network server using encrypted information sent over the second new wireless network connection in response to determining that the second new wireless network connection is not secure;
      upon establishing the virtual private network connection, indicate to the user that the second new wireless network connection is secure based on the virtual private network connection being established; and
      receive content from the at least one remote content server over the second new wireless network connection as encrypted information from the virtual private network server.

8. The system of claim 7, wherein the metered data connection is a cellular data connection.

9. The system of claim 7, wherein the proxy server and the virtual private network server are the same computing device.

10. The system of claim 7, wherein the hardware processor is further programmed to receive at the user device, via the proxy server, pushed content from a server, wherein the pushed content was sent by the server without a request for the content from the user device and wherein the pushed content is compressed in the one or more compression formats associated with the proxy server.

11. The system of claim 7, wherein the hardware processor is further programmed to:
   receive user input related to the first new wireless connection; and
   determine based on the user input that the first new wireless connection is a metered connection.

12. The system of claim 7, wherein the hardware processor is further programmed to:
   detect a third new wireless network connection;
   determine that the third new wireless network connection is the metered data connection;
   determine that the third new wireless network connection is a secure connection;
   determine that the virtual private network connection is established with the virtual private network server; and
   upon determining that the first new wireless network connection is a secure connection and that the virtual private network connection is established with the virtual private network server, discontinue the virtual private network connection.

13. A non-transitory computer-readable medium containing computer executable instructions that, when executed by a processor of a user device, cause the processor to perform a method for facilitating compression over a metered data connection, the method comprising:
   detecting a first new wireless network connection;
   determining that the first new wireless network connection is a metered data connection;
   sending, via a proxy server, one or more requests for content to at least one remote content server using the metered data connection in response to determining that the first new wireless connection is a metered data connection;
   receiving, via the proxy server, content from the content server using the metered data connection, wherein the content is compressed by the proxy server;
   determining that the first new wireless network connection is a secure connection;
   upon determining that the first new wireless network connection is a secure connection, indicating to a user that the first new wireless network connection is secure;
   detecting a second new wireless network connection;
   determining that the second new wireless network connection is a non-secure wireless connection;

determining that the second new wireless network connection is not a metered data connection;

causing the proxy server to inhibit compression of content sent to the user device in response to determining that the second new wireless network connection is not a metered data connection;

causing information sent by the user device over the second new wireless network connection to be encrypted in response to determining that the second new wireless network connection is not secure;

establishing a virtual private network connection between the user device and a virtual private network server using encrypted information sent over the second new wireless network connection in response to determining that the second new wireless network connection is not secure;

upon establishing the virtual private network connection, indicating to the user that the second new wireless network connection is secure based on the virtual private network connection being established; and receiving content from the at least one remote content server over the second new wireless network connection as encrypted information from the virtual private network server.

14. The non-transitory computer-readable medium of claim 13, wherein the metered data connection is a cellular data connection.

15. The non-transitory computer-readable medium of claim 13, wherein the proxy server and the virtual private network server are the same computing device.

16. The non-transitory computer-readable medium of claim 13, wherein the method further comprises receiving at the user device, via the proxy server, pushed content from a server, wherein the pushed content was sent by the server without a request for the content from the user device and wherein the pushed content is compressed in the one or more compression formats associated with the proxy server.

17. The non-transitory computer-readable medium of claim 13, wherein determining that the first new wireless network connection is a metered data connection comprises receiving user input related to the first new wireless connection, and wherein the method further comprises determining based on the user input that the first new wireless connection is a metered connection.

18. The non-transitory computer-readable medium of claim 13, wherein the method further comprises:

detecting a third new wireless network connection;

determining that the third new wireless network connection is the metered data connection;

determining that the third new wireless network connection is a secure connection;

determining that the virtual private network connection is established with the virtual private network server; and upon determining that the first new wireless network connection is a secure connection and that the virtual private network connection is established with the virtual private network server, discontinuing the virtual private network connection.

* * * * *

UNITED STATES PATENT AND TRADEMARK OFFICE
CERTIFICATE OF CORRECTION

PATENT NO. : 9,253,160 B2
APPLICATION NO. : 14/657047
DATED : February 2, 2016
INVENTOR(S) : Kent Lawson Page 1 of 1

It is certified that error appears in the above-identified patent and that said Letters Patent is hereby corrected as shown below:

In the Claims

Claim 1, line 50, "establishing, the hardware processor" should be --establishing, using the hardware processor--.

Signed and Sealed this
Third Day of May, 2016

Michelle K. Lee
*Director of the United States Patent and Trademark Office*